Patented Sept. 7, 1954

2,688,613

UNITED STATES PATENT OFFICE 2,688,613

AZO-DYESTUFFS

Herbert Kracker, Frankfurt (Main)-Hoechst, Germany, assignor to Farbwerke Hoechst Aktiengesellschaft vormals Meister Lucius und Bruning, Frankfurt (Main)-Hoechst, Germany, a company of Germany No Drawing. Application October 10, 1951, Serial No. 250,800

Claims priority, application Germany October 18, 1950

7 Claims. (Cl. 260—207)

The present invention relates to new azo-dyestuffs. It is based on the observation that 4-amino-2-hydroxy-benzene-1-carboxylic acid and the derivatives thereof corresponding to the following general formula

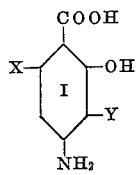

wherein X and Y stand for hydrogen or any substituent, may be used with advantage as passive components for the manufacture of valuable azo-dyestuffs. They can be combined with any active components, for instance diazotized aniline, substituted anilines, aniline sulfonic acids, amino-phenol-sulfonic acids, aniline-carboxylic acids, amino-phenol-carboxylic acids, naphthylamine-sulfonic acids and the like. In this manner there are obtained azo-dyestuffs of the general formula:

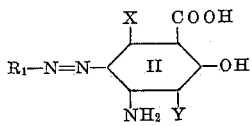

wherein X and Y have the meaning indicated above and $R_1$ stands for the radical of any diazo-component.

Moreover, 4-amino-2-hydroxybenzene-1-carboxylic acid and the derivatives thereof can be used as middle component in polyazo-dyestuffs. I have found that the ortho-amino-azo-dyestuffs corresponding to the Formula II can be further diazotized and the diazo-compounds can be combined again with any coupling components, for instance 1 - amino - 3 - methylbenzene, 1 - amino-naphthalene, 1-amino-2-methoxy-5-methylbenzene, naphthol- and naphthylamine-sulfonic acids, 1- and 2-hydroxy-naphthalenes, pyrazolones or the like, to form diazo-dyestuffs of the following general formula:

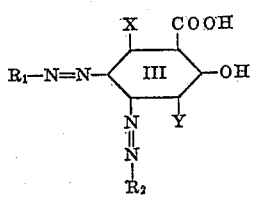

wherein $R_1$ has the meaning indicated in Formula II, and $R_2$ stands for the radical of any coupling component. If the component $R_2$ contains an amino-group capable of being diazotized, for instance by using 1-amino-naphthalene, 1-amino-3-methylbenzene, 1-amino-2-methoxy-5-methylbenzene, 1-aminonaphthalene-6- or -7-sulfonic acid or the like, the disazo-dyestuff can be further diazotized and the diazo-compounds can be combined once more with any passive component. There are thus obtained trisazo-dyestuffs of the following general formula

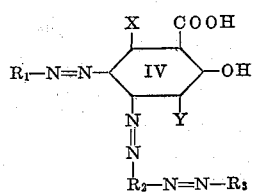

wherein $R_1$ has the same meaning as indicated in Formula II, $R_2$ stands for the radical of any coupling component containing a diazotizable amino-group and $R_3$ represents the radical of any coupling component.

Since the new dyestuffs contain the salicylic acid grouping, they can be after-treated on the fiber or in substance with compounds capable of yielding metal, especially with chromium salts. The metal complex compounds thus formed considerably improve the fastness properties of the dyestuffs. The orange to black dyeings, produced by the after-treatment, are distinguished by good general fastness properties. With particular advantage the new dyestuffs can be applied to the fiber directly in the form of their chromium complex compounds according to the so-called meta-chrome process.

The following examples serve to illustrate the invention, but they are not intended to limit it thereto, the parts being by weight:

Example 1

144 parts of 4-chloro-2-amino-1-hydroxybenzene are diazotized at a temperature between 0° C. and 5° C. with 280 parts of hydrochloric acid of 24° Bé. and 69 parts of sodium nitrite. The diazo-solution thus obtained is added to a solution of 153 parts of 4-amino-2-hydroxybenzene-1-carboxylic acid in 125 parts of caustic soda and 2000 parts of water. As soon as the coupling reaction is finished, the dyestuff, most of which has separated, is completely salted out. After drying, it forms a deep black-brown powder and dyes wool from an acid bath dull yellow-brown shades which by after-chroming turn into deep red-brown tints of good fastness properties, especially of a good fastness to washing, to fulling, to potting and to light. Dyeings of the same good properties are obtained by applying the dyestuff to the fiber directly as chromium complex compound from a bath containing ammonium-sulfate and potassium chromate according to the meta-chrome process. The dyestuff corresponds to the following formula

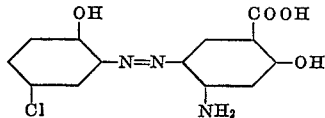

The following dyestuffs may be obtained in a similar manner:

parts of water, precipitated in a finely dispersed state by means of 280 parts of hydrochloric acid of 24° Bé. and diazotized with 69 parts of sodium nitrite at a temperature between 5° C. and 10° C. The suspension of the diazo-compound is caused to run into a solution of 153 parts of 4-amino-2-hydroxybenzene-1-carboxylic acid in 125 parts of caustic soda and 500 parts of water. When the coupling reaction is complete, the mixture is acidified with 190 parts of hydrochloric acid of 24° Bé. and completely salted out with sodium chloride. The dyestuff is obtained in the form of a nearly black powder. It dyes wool from an acid bath claret tints which after the treatment with sodium bichromate and sulfuric acid turn into deep brown shades with a violet

| Diazo Component | Coupling Component | Shade of the after-chromed dyeing |
|---|---|---|
| 1. 1-amino-2-nitro-benzene. | 4-amino-2-hydroxybenzene-1-carboxylic acid. | covered orange. |
| 2. 4-nitro-2-amino-1-hydroxybenzene. | ..do.. | red-brown. |
| 3. 4,6-dinitro-2-amino-1-hydroxybenzene. | ..do.. | Do. |
| 4. 6-chloro-4-nitro-2-amino-1-hydroxybenzene. | ..do.. | Do. |
| 5. 1-amino-4-nitrobenzene. | 4-amino-6-methyl-2-hydroxybenzene-1-carboxylic acid. | orange. |
| 6. 5-nitro-2-amino-1-hydroxybenzene. | 4-amino-3-chloro-2-hydroxybenzene-1-carboxylic acid. | deep red-brown. |
| 7. 4,6-dichloro-2-amino-1-hydroxybenzene. | 4-amino-6-chloro-3-methyl-2-hydroxybenzene-1-carboxylic acid. | red-brown. |
| 8. 4-chloro-6-nitro-2-amino-1-hydroxybenzene. | 4-amino-2-hydroxybenzene-6-sulfonic acid-1-carboxylic acid. | Do. |
| 9. 3-amino-4-hydroxy-1-methylbenzene. | 4-amino-2-hydroxybenzene-1-carboxylic acid. | reddish brown. |
| 10. 5-nitro-2-amino-1-hydroxybenzene. | ..do.. | deep dark brown. |
| 11. 4-chloro-5-nitro-2-amino-1-hydroxybenzene. | ..do.. | violet. |

Example 2

288 parts of 6-nitro-2-amino-1-hydroxybenzene-4-sulfonic acid of 81.2 per cent. strength are dissolved in 40 parts of caustic soda and 1000 hue of good general fastness properties, particularly of a good fastness to washing, to fulling, to rubbing, to alkalies and to light.

The following dyestuffs are obtained in a similar manner:

| Diazo-Component | Coupling Component | Shade of the after-chromed dyeing |
|---|---|---|
| 1. 1-aminobenzene-2-sulfonic acid. | 4-amino-2-hydroxy-benzene 1-carboxylic acid. | medium brown. |
| 2. 1-aminobenzene-2,4-disulfonic acid. | ..do.. | Do. |
| 3. 1-aminonaphthalene 5-sulfonic acid. | ..do.. | covered brown. |
| 4. 1-aminobenzene-2-carboxylic acid. | ..do.. | yellow-brown. |
| 5. 6-chloro-2-amino-1-hydroxybenzene-4-sulfonic acid. | ..do.. | reddish brown. |
| 6. 4-nitro-2-amino-1-hydroxybenzene-6-sulfonic acid. | ..do.. | Do. |
| 7. 1-aminobenzene-4-sulfonic acid. | 4-amino-6-methyl-2-hydroxybenzene-1-carboxylic acid. | yellow-brown. |
| 8. 1-aminobenzene-3-sulfonic acid. | 4-amino-3-chloro-2-hydroxybenzene-1-carboxylic acid. | medium brown. |
| 9. 1-aminonaphthalene-4-sulfonic acid. | 4-amino-6-chloro-3-methyl-2-hydroxybenzene-1-carboxylic acid. | red-brown. |
| 10. 4-nitro-2-amino-1-hydroxybenzene-6-sulfonic acid. | 4-amino-2-hydroxy-benzene-6-sulfonic acid-1-carboxylic acid. | reddish brown. |
| 11. 5-amino-2-hydroxy-benzene-1-carboxylic acid. | 4-amino-2-hydroxy-benzene-1-carboxylic acid. | medium brown. |
| 12. 5-nitro-2-amino-1-hydroxybenzene-4-sulfonic acid. | ..do.. | deep red-brown. |
| 13. 3-amino-2-hydroxy-1-methylbenzene-5-sulfonic acid. | ..do.. | red-brown. |
| 14. 3-amino-4-hydroxy-1-methylbenzene-5-sulfonic acid. | ..do.. | Do. |
| 15. 3-amino-4-hydroxy-diphenylsulfone-3'-sulfonic acid. | ..do.. | Do. |
| 16. 6-nitro-2-amino-1-hydroxybenzene-4-sulfonic acid. | ..do.. | brown with a violet hue. |

| Diazo-Component | Coupling Component | Shade of the after-chromed dyeing |
|---|---|---|
| 17. 4-chloro-1-amino-benzene-3-sulfonic acid. | 4-amino-2-hydroxy-benzene-1-carboxylic acid. | yellowish brown. |
| 18. 6-chloro-3-amino-1-methylbenzene-4-sulfonic acid. | .....do............... | Do. |
| 19. 2-amino-4-acetylamino-1-hydroxy-benzene-6-sulfonic acid. | .....do............... | dark brown. |
| 20. 2-amino-4-acetylamino-1-hydroxy-benzene-6-sulfonic acid. | 4-amino-3.6-dimethyl-2-hydroxybenzene-1-carboxylic acid. | Do. |
| 21. 3-amino-4-hydroxybenzophenone-2'-carboxylic acid. | 4-amino-3.6-dichloro-2-hydroxybenzene-1-carboxylic acid. | very reddish brown. |
| 22. 3-amino-4-hydroxybenzophenone-2'-carboxylic acid. | 4-amino-2-hydroxy-benzene-1-carboxylic acid. | Do. |
| 23. 5-nitro-2-amino-benzene-1-carboxylic acid. | .....do............... | red. |
| 24. 2-amino-5-benzoyl-amino-4'-hydroxy-diphenylsulfone-3'-carboxylic acid. | .....do............... | orange. |

*Example 3*

196 parts of 1-aminobenzene-4-sulfonic acid of 88.4 per cent. strength are diazotized with 280 parts of hydrochloric acid of 24° Bé. and 69 parts of sodium nitrite, and the diazo-solution is then combined with a solution of 153 parts of 4-amino-2-hydroxybenzene-1-carboxylic acid in 165 parts of caustic soda and 500 parts of water with formation of the dyestuff. The solution of the dyestuff is clarified, mixed with 69 parts of sodium nitrite and the mixture is then caused to run at 0° C. into 375 parts of hydrochloric acid of 24° Bé. The clear diazo-solution is then caused to run into a solution of 174 parts of 1-phenyl-3-methyl-5-pyrazolone in 165 parts of caustic soda and 500 parts of water. When the formation of the dyestuff is complete, the mixture is acidified with 190 parts of hydrochloric acid of 24° Bé. and the dyestuff is completely salted out with sodium chloride. It is a brown powder and dyes wool from an acid bath yellow-brown tints which by after-chroming turn into full brown shades of good general fastness properties, particularly of good fastness to decatizing, to carbonizing, to alkalies and to light. The dyestuff corresponds to the following formula

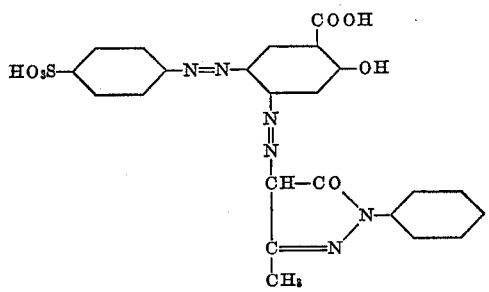

The following dyestuffs are obtained in a similar manner:

| Initial Component | Middle Component | Final Component | Shade of the after-chromed dyeing |
|---|---|---|---|
| 1. 1-aminobenzene-4-sulfonic acid | 4-amino-2-hydroxy-benzene-1-carboxylic acid. | 1-hydroxy-naphthalene. | brown. |
| 2. 1-aminobenzene-3-sulfonic acid | .....do............... | 2-hydroxy-naphthalene. | yellowish brown. |
| 3. 1-aminobenzene-2-sulfonic acid | .....do............... | 1.5-dihydroxynaphthalene. | dark brown. |
| 4. 1-aminobenzene-4-sulfonic acid | .....do............... | 1-hydroxy-naphthalene-4-sulfonic acid. | brown. |
| 5. 1-aminonaphthalene-4-sulfonic acid | .....do............... | 1.3-dihydroxybenzene. | Do. |
| 6. 1-aminobenzene-2.5-disulfonic acid | .....do............... | 1-hydroxy-naphthalene. | Do. |

*Example 4*

The diazo-solution of the diazotized dyestuff from diazotized 1-aminobenzene-4-sulfonic acid and 4-amino-2-hydroxybenzene-1-carboxylic acid obtained as described in Example 3 is combined in hydrochloric acid solution with 143 parts of 1-aminonaphthalene, the disazo-dyestuff thus obtained is diazotized again with 69 parts of sodium nitrite and the diazo-solution is then coupled in a caustic alkaline solution with 144 parts of 2-hydroxynaphthalene. The trisazo-dyestuff is obtained in the form of a deep dark-brown powder. It dyes wool from an acid bath and then after-chromed full red-brown tints which are distinguished by good fastness properties, especially by a good fastness to washing, to decatizing, to alkalies and to light. The dyestuff corresponds to the following formula

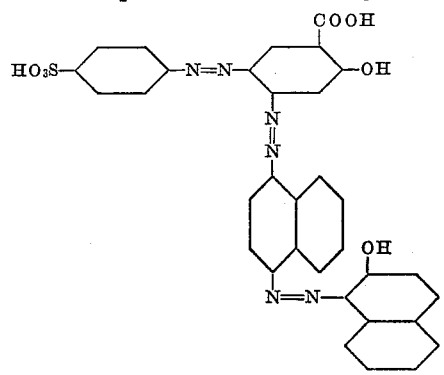

Similar dyestuffs are obtained by using, instead of 1-aminobenzene-4-sulfonic acid, other aniline-sulfonic acids, chloraniline-sulfonic acids, chloro-toluidine-sulfonic acids, nitraniline-sulfonic acids, naphthylamine-sulfonic acids or the like, instead of 1-aminonaphthalene, for instance 3-amino-4-methoxy-1-methylbenzene, 1-amino-3-methylbenzene, 1-amino-2.5-dimethylbenzene, 1-amino - 2.5 - dimethoxybenzene, 1-amino - 2.5 - diethoxybenzene, 1 - aminonaphthalene-6- or -7-sulfonic acid or the like, and instead of 2-hydroxynaphthalene, for instance 1-hydroxynaphthalene, 1-hydroxynaphthalene-4- or -5-sulfonic acid, 2-hydroxynaphthalene-6-sulfonic acid, 1-hydroxynaphthalene-3.6-disulfonic acid, 2-hydroxynaphthalene-3.6-disulfonic acid, 1-phenyl-3-methyl-5-pyrazolone, 1.3-dihydroxybenzene and others.

I claim:
1. The azo-dyestuffs corresponding to the following general formula

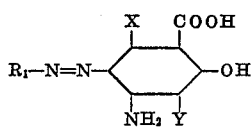

wherein R₁ is a radical selected from the group which consists of radicals of the benzene and naphthalene series, and X and Y each represent a substituent selected from the group which consists of hydrogen, methyl and chlorine.

2. The azo-dyestuffs corresponding to the following general formula

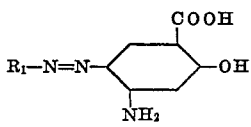

wherein R₁ is a radical selected from the group which consists of radicals of the benzene and naphthalene series containing at least one group imparting solubility in water.

3. The azo-dyestuff corresponding to the following formula

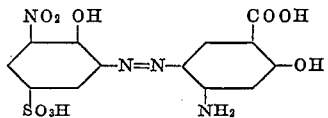

4. The azo-dyestuff corresponding to the following formula

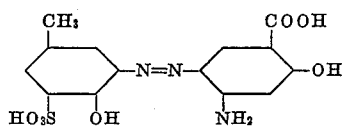

5. The azo-dyestuff corresponding to the following formula

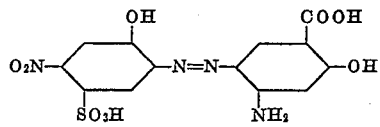

6. The azo-dyestuff corresponding to the following formula

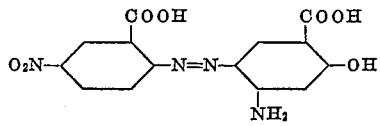

7. The azo-dyestuff corresponding to the following formula

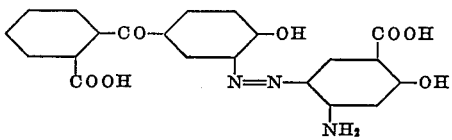

References Cited in the file of this patent
UNITED STATES PATENTS

| Number | Name | Date |
|---|---|---|
| 1,157,169 | Mettler | Oct. 19, 1915 |
| 1,848,650 | Ostertag | Mar. 8, 1932 |